Dec. 24, 1963  F. R. SCHROEDER  3,115,035
WIPER ARM TESTING DEVICE OR THE LIKE
Filed May 31, 1960
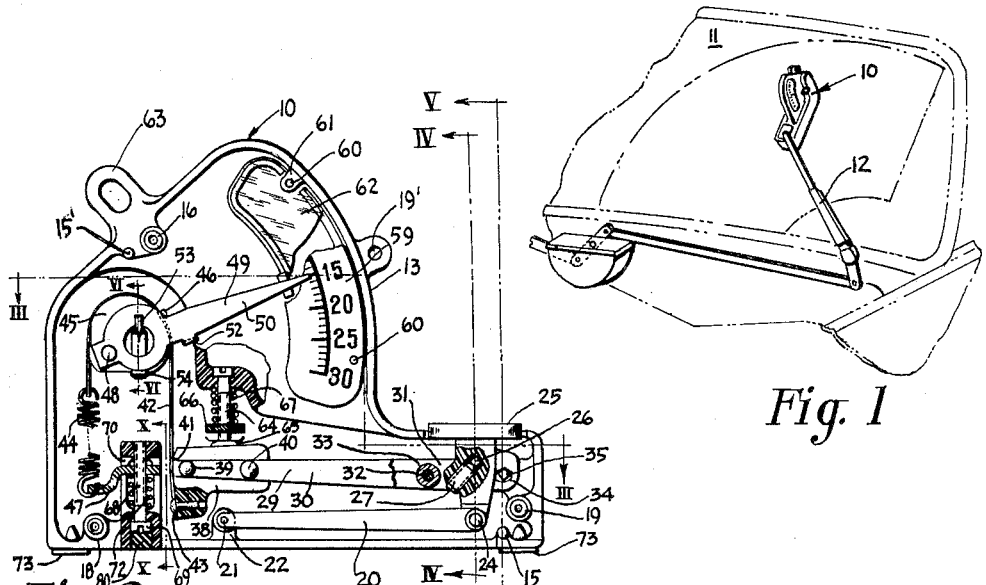
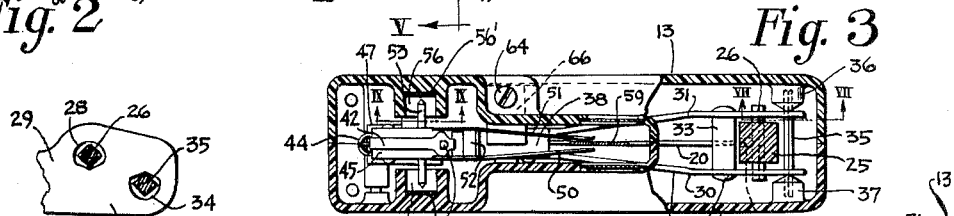
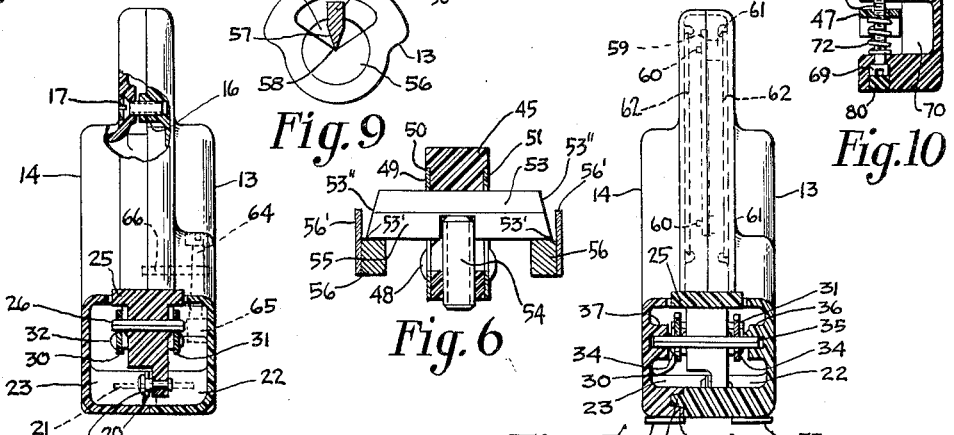
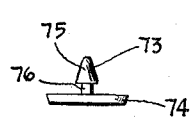
INVENTOR.
FREDERICK R. SCHROEDER
BY
Bean Brooks Buckley & Bean.
ATTORNEYS

United States Patent Office 3,115,035
Patented Dec. 24, 1963

3,115,035
WIPER ARM TESTING DEVICE OR THE LIKE
Frederick R. Schroeder, Buffalo, N.Y., assignor to Trico Products Corporation, Buffalo, N.Y.
Filed May 31, 1960, Ser. No. 32,951
3 Claims. (Cl. 73—141)

The present invention relates generally to the field of scales and more particularly to an improved tester for measuring the tension of the spring in a windshield wiper arm. While the following description will refer exclusively to the testing of the pressure of a wiper arm, it will be appreciated that the disclosed scale possesses numerous features applicable to the general scale art.

It is one object of the present invention to provide an improved windshield wiper arm pressure tester in which the platform on which the end of the wiper arm is placed during testing moves a very small distance thereby permitting the spring in the wiper arm to be tested in the attitude which it normally assumes during wiper operation, to thereby provide the person testing the arm with an accurate reading of the pressure provided by the arm in operation.

Another object of the present invention is to provide an improved wiper arm pressure tester which consists of a relatively small number of parts and which can be assembled by relatively untrained personnel.

A further object of the present invention is to provide an improved windshield wiper arm pressure tester in which certain of the critical parts are self-aligning and self-centering, thereby eliminating the necessity for the use of gauges or specialized tools in assembling the testers. Other objects and attendant advantages of the present invention will readily be perceived hereafter.

The windshield wiper arm pressure tester of the present invention includes a housing which is fabricated from two generally similar halves. Each of these halves is adapted to provide the support for opposite ends of a first fulcrum pin. A main lever having spaced-apart legs is adapted to be supported by the fulcrum pin by means of a self-aligning fit consisting, in this instance, of oversized apertures in corresponding parts of each of these legs having vertices of generally similar configuration to a vertex formed on the fulcrum pin. A load receiving platform is provided for supporting the end of a wiper arm. A second self-aligning fulcrum pin is located between the load bearing platform and the main lever, the self-aligning connection between the second pin and the main lever being similar to that described above with respect to the first fulcrum pin, with each leg of the main lever supporting one end of the second fulcrum pin. Whenever the platform is subjected to load, the main lever will pivot about the first fulcrum pin. Indicating means including a pointer and a scale are associated with the main lever, the pointer being supported on a knife edge which in turn has its ends supported in each half of the housing. A stabilizing lever is mounted at one end on a pin supported by opposite halves of the housing and the other half guides the platform for movement in a predetermined path, the stabilizing lever connection to the platform permitting the use of the above described self-aligning connections which are rather loose. Separate adjustments are provided on the tester for setting the zero reading of the pointer and for adjusting the tension of a spring against which the load acts. The main lever is a metal stamping and the apertures therein used for self-aligning purposes are thus very accurately positioned during fabrication to thereby enhance the accuracy of the tester. Because one end of the first fulcrum pin, one end of the pin supporting the stabilizing lever, and one end of the knife edge are all supported by opposite halves of the housing, it can readily be seen that the internal mechanism of the tester can be placed in position in one half of the housing and thereafter the other half of the housing may be located on the first half to receive the other ends of the above-mentioned elements to thereby securely hold all of the tester components in position, this construction permitting the assembling of the tester by relatively untrained personnel. The present invention will be more fully understood when the following portions of the specification are read in conjunction with the accompanying drawings wherein:

FIG. 1 is a fragmentary perspective view of an automotive vehicle with the arm pressure tester of the present invention in position on the windshield thereof in testing position;

FIG. 2 is a side elevation of the arm pressure tester of the present invention with a portion of the housing removed to disclose the orientation of the internal components;

FIG. 3 is a view taken along line III—III of FIG. 2;
FIG. 4 is a view taken along line IV—IV of FIG. 2;
FIG. 5 is a view taken along line V—V of FIG. 2;
FIG. 6 is a view taken along line VI—VI of FIG. 2;
FIG. 7 is a view taken along line VII—VII of FIG. 3;
FIG. 8 is a detailed view of one of the plastic feet which engage the windshield;
FIG. 9 is a view taken along line IX—IX of FIG. 3; and
FIG. 10 is a view taken along line X—X of FIG. 2.

The wiper arm pressure tester of the present invention is approximately 4" long, 3" high, and 1" wide. This size is convenient for permitting it to fit easily in the pocket of a gas station attendant or the like and is also of a size for convenient handling.

As can be seen from FIG. 1, the arm pressure tester 10 is adapted to be positioned on a vehicle windshield 11 for the purpose of testing the pressure of the wiper arm 12 which is mounted proximate the windshield in any conventional manner.

The arm pressure tester 10 of the present invention includes a housing made out of two independent sections 13 and 14 which are preferably molded from a plastic material. Housing section 13 includes a locating pin 15 which is molded integrally therewith and is adapted to fit within a mating aperture 16' (FIG. 5) of housing section 14. Another locating pin 15' in housing section 13 is also adapted to fit in a corresponding aperture (not shown) in housing section 14. The connection 15—16' and 15' with its corresponding aperture not only aid in aligning the two housing sections 13 and 14 during assembly but also provide a certain amount of rigidity for preventing these sections from moving relative to each other after they have been assembled. Furthermore, housing section 13 contains a tapped protuberance 16 (FIGS. 2 and 4) which is adapted to threadably receive screw 17 (FIG. 4), the head of the screw engaging the peripheral portions of a countersunk bore in housing section 14 to thereby aid in holding the two housing sections together. In addition to screw 17 and tapped protuberance 16, additional tapped protuberances 18 and 19 (FIG. 2) which are similar to protuberance 16 are also provided in housing section 13 and screws similar to screw 17 are adapted to be positioned in housing section 14 in a manner similar to that described above relative to screw 17. Thus in addition to the engagement provided by pins 15—15' and their mating apertures, there are three screws holding the housing sections 13 and 14 together.

The mechanism for indicating the pressure of a wiper arm is as follows: A stabilizing link 20 has one end thereof pivotally mounted on pin 21 (FIGS. 2 and 4). Pin 21 in turn has one end thereof fitting within apertured protuberance 22 formed integrally on housing section 13 and the other end thereof fitting within apertured protuberance 23 formed integrally on housing section 14. The other end of stabilizing link 20 is pivotally mounted by rivet 24 (FIGS. 2 and 4) on the lower end of platform 25. The purpose of stabilizing link 20 is for causing the platform 25 to move in a substantially vertical direction when a load is applied thereto. The housing 10 is upright and has a basal extension in which the platform is arranged for easy access. The operating mechanism is thus contained within a chamber of L-shape. By grasping the upright portion by the hand the platform is readily placed beneath a wiper arm.

Platform 25 has a self-aligning load bearing pin or fulcrum 26 rigidly secured therein by set screw 27 (FIGS. 2 and 3). Fulcrum 26 is of substantially square cross section and the aperture in platform 25 in which is located is of like cross section. The outer ends of load bearing pin 26 fit loosely in sector-like shaped apertures 28 (FIG. 7) located toward the end of main lever 29. As can be seen from FIG. 3, main lever 29 includes two legs 30 and 31 which straddle the central portion of platform 25 and these legs are connected at a point proximate the platform by a rivet 32, the spacing between legs 30 and 31 being determined by spacer 33. The extreme outer end portions of legs 30 and 31 of main lever 29 have sector shaped apertures 34 therein for receiving self-aligning fulcrum pin 35, the ends of which are anchored in protuberances 36 and 37 in housing portions 13 and 14, respectively, the protuberances being integrally molded parts of the housing portions. Fulcrum pin 35 is of generally square cross section and fits in mating square apertures in protuberances 36 and 37, the latter holding pin 35 in the orientation shown in the drawings. It can readily be seen from FIG. 7 that the lower portion of sector shaped opening 28 is of a V-shape and the upper part of sector shaped opening 34 is also of a V-shape. Thus when a load is applied to platform 25, one corner or knife edge of pins 26 and 35 will engage the V-shaped portions of sectors 28 and 34, respectively, and in this manner the length of the main lever between the fulcrum pin 35 and load bearing pin or fulcrum 26 is accurately predetermined. The value of the foregoing arrangement is in the fact that the sector-like apertures in legs 30 and 31 are located by a die punching operation, and the fact that pins 26 and 35 are self-locating on main lever 29 to permit accurate pressure measurements by the use of a mass produced part.

The ends of legs 30 and 31 of main lever 29 which are remote from pin 35 straddle a plastic block 38 and are secured thereto by rivets 39 and 40. The outer end 41 of block 38 has a radius of curvature the center of which is fulcrum pin 35. One end of band or ribbon 42 is secured to block 38 by rivet 43 and the other end of band 42 is secured to spring 44. The intermediate portion of band 42 is staked to cam 45 by rivet 46. The end of spring 44 remote from its connection with band 42 is hooked onto plate 47 (FIGS. 2 and 10). Secured to cam 45 by means of rivet 48 is a dual pointer 49 having hands 50 and 51 formed from a single stamping and connected to each other by integral rib 52. Cam 45 has a slot therein which receives blade 53. As can be seen from FIG. 6, a set screw 54 is adapted to engage a cut-away section 55 of blade 53 to thereby hold it in firm engagement in the slot (not numbered) in cam 45. Each end of blade 53 is adapted to fit in a cut-away portion of each housing 13 and 14 (FIG. 9). Each cut-away portion is of a configuration to receive a steel insert 56, the knife edge 57 resting at the vertex 58 formed therein.

It can readily be seen therefore that when a load is applied to platform 25, the latter will move downwardly, as guided by its connection with the housing through stabilizing link 20. Because platform 25 can pivot about the axis of rivet 24, load bearing pin 26 will be able to seat itself in sector shaped cutout 28 with the corner of square pin 26 resting in the vertex of the cutout. Likewise, main lever 29 will be able to adjust itself so that the fulcrum pin 35 mounted in the housing will support it at the vertex of sector shaped cutout 34. In essence therefore a third-class lever is provided wherein the travel of the outer end of plastic block 38 will be magnified when compared to the movement of platform 25. The downward movement of block 38 will be against the bias of spring 44 and the movement of cam 45 to which band 42 is attached will result in the movement of pointer 49 to give an indication on the scale or chart 59. Scale or chart 59, which is printed in ounces of pressure on both sides thereof, is secured to housing section 13 by plastic pips 60 extending from protuberances 61 (FIG. 5) molded integrally with housing section 13, the plastic pips fitting in apertures in the scale and being deformed after the scale is positioned thereon. Thus the scale is held between the shoulders on protuberances 61 and the deformed pips. Each housing section 13 and 14 has a clear plastic window such as 62 therein, the latter fitting in a molded depression in the housing and being secured thereto by fusing of the plastic. Housing section 13 has an apertured protuberance 63 for permitting the scale to be hung on a hook, if this is desired.

There is two independent adjustments in the wiper arm tester. The first is for adjusting the pointer at the zero mark. This adjustment consists of a screw 64 (FIGS. 2 and 4) the lower end of which is adapted to be received in an aperture in protuberance 65 formed integrally in housing section 13. Threadably mounted on screw 64 is a plate 66 and the latter is biased downwardly by spring 67 interposed between it and a section of the housing. This positioning of spring 67 retains screw 64 in the housing. As can be seen from FIG. 3, one end of plate 66 is located close to the wall of housing 13, and this fit prevents plate 66 from turning when screw 66 is turned. Plate 66 is adapted to bear on the top of block 38 when there is no load on platform 25 and thus the adjustment of screw 64 is utilized to set pointer 49 at zero to provide the initial scale reading.

The other adjustment is for setting the tension in the spring. To this end a screw 68 (FIGS. 2 and 10) has the head 69 thereof journaled for rotation in the lower portion of U-shaped portion 70 formed integrally with the side of housing 13. The upper end of U-shaped portion 70 is provided with an aperture for receiving the end of screw 68 remote from head 69. A spring 72 encircles screw 68 and the lower end of the spring bears on the inner side of the U-shaped portion and the upper end bears on the underside of plate 47 which is tapped to receive screw 68. In this manner, spring 72 retains screw 68 in the housing. It can readily be seen therefore that as screw 68 is turned, plate 47 will move up or down and thus cause the end of spring 44 attached thereto to move up or down, accordingly. After the spring has been adjusted at the factory, plastic plug 80 is inserted in the housing to cover the screw head 69.

It can readily be seen that the zero adjustment is independent of the spring tension adjustment and that the adjustment of the former will not affect the accuracy of the latter.

Cam portion 45, about which band 42 fits, is of such a configuration so that the eccentric portion to the left of blade 53 (FIG. 2) counterbalances the weight of pointer 49 thereby preventing any inaccuracy in the scale reading due to the weight of the pointer. The cam, by effectively causing the downward force exerted by main lever 29 on cam 45 to act through a shorter lever arm than the arm through which spring 44 acts permits the latter to be of a relatively weak construction.

As can be seen from FIGS. 3, 6, and 9, the outer lateral extremities 53' of knife edge 53 are in the form of a point. In other words the ends 53'' of the knife edge converge inwardly from the bottom. Therefore, when knife edge 53 is in position on inserts 56, the only contact between the knife edge and side walls 56' of inserts 56 is at points 53', this arrangement preventing the entire ends 53" of the knife edge from frictionally engaging the walls 56' thereby obviating any inaccuracy due to friction therebetween. Furthermore, the length of knife edge 53 is less than the distance between walls 56'. Therefore both extremities 53' cannot be in engagement with both walls 56' at the same time. The side walls associated with inserts 56 are preferably separate metal discs formed by a simple stamping operation.

The knife edge 53 is self-aligning and self-centering within cam 45. More specifically, as noted above, the upper portion of knife edge 53 fits within a slot in cam 45. Furthermore, set screw 54 fits into a central slot in knife edge 53. Since the slot in the cam 45 and the dimensions of knife edge 53 are held to certain tolerances, once set screw 54 is tightened in position the lower edge of knife edge 53 is positioned at the desired location within cam 45. Furthermore, the outer points 53' are positively located in an automatic manner as a result of tightening set screw 54 in the central slot in the knife edge. Thus knife edge 53, which serves as a pivot for cam 45 and the pointer 49 mounted thereon, is self-aligning and self-centering incidental to its installation in cam 45, thereby permitting this knife edge to be installed by relatively untrained personnel.

As can be seen from FIGS. 2, 5, and 8, rubber pads 73 are adapted to be inserted in the housing. Three pads are used so as to provide three points at which the underside of the arm pressure tester rests on the windshield. In this manner firm contact with the windshield is assured. Pad 73 consists of a base portion 74 and a tapered portion 75 connected by an intermediate neck portion 76. In assembly tapered portion 75 is inserted through a hole in the housing and the enlarged part of tapered portion 75 retains the pad in the housing.

It can readily be seen that the small travel of platform 25, due to the linkage which is used for magnifying the travel of the platform, permits the pressure of the spring in the wiper arm to be read at the position which it normally occupies when a wiper blade is mounted on the end thereof.

In accordance with the present invention the lower surface of block 38 (FIG. 2) is adapted to engage the upper surfaces of protuberances 22 and 23 (FIG. 4) when block 38 has traveled its maximum downward distance. In other words, protuberances 22 and 23 act as a positive stop for main lever 29.

The pressure tester of the present invention can readily be assembled by relatively untrained personnel. Plates 65 and 47 are inserted in the housing and secured to the screws with which they are associated in a manner which is obvious from mere inspection. Disks 56' are dropped into the housing halves and bearings or inserts 56 are located and pressed into the housing halves by the use of a fixture, the bearings holding disks 56' in place. The windows 62 are then heat sealed into the housing halves, as described above. Thereafter a subassembly is made up from cam 45, main lever 29, platform 25, and stabilizing link 20. More specifically, pointer 49 is slid over cam 45 and knife edge 53 is positioned in aligned slots in the pointer and the cam. Thereafter set screw 54 is inserted in cam 45 and the end of the set screw is located in the slot in the knife edge 53, thereby providing the above-described self-centering and self-locating action. Rivet 48 is then inserted to secure pointer 49 to cam 45. Plastic block 38 is riveted to the spaced-apart legs 30 and 31 of the main lever. Thereafter spacer 33 and rivet 32 are assembled in the main lever. Stabilizing link 20 is riveted to platform 25 by rivet 24. Platform 25 is positioned between the spaced-apart legs 30 and 31 of main lever 29 and fulcrum 26 is placed in position in the platform with the ends of the fulcrum in position in the self-centering openings of the main lever. Set screw 27 is then tightened to secure fulcrum 26 in the platform 25. Band 42 is then staked to both plastic block 38 and cam 45, thereby completing a subassembly of the cam 45, band 42, main lever 29, and stabilizing link 20. Pin 21 and fulcrum 35 are then located in housing half 13. Thereafter the subassembly consisting of the stabilizing link 20, main lever 29, platform 25, and cam 45 are inserted in housing half 13 with the stabilizing link 20 fitting on pin 21 and the apertures 34 in main lever 29 receiving pin 35, and with one end 53' of knife edge 53 positioned on metallic insert 56. Spring 44 is then connected between band 42 and plate 47. Scale or chart 59 is then placed in position in housing half 13 in the manner described above. To complete the assembly, housing half 14 is placed in position on housing half 13, housing half 14 receiving the other end of fulcrum 35, the other end of knife edge 53, the other end of stabilizing pin 21, and protuberances or locating pins 15 and 15' from housing half 13. Thereafter it is only necessary to insert the three screws, such as 17, in tapped apertures 16, 18, and 19 and tighten them to secure the housing halves in position with all the internal components of the tester located therein in the required manner. Furthermore, a tapped aperture 19' may be supplied in housing half 13 to receive a fourth screw like 17 to securely hold the housing halves together in the area of scale or chart 59. In lieu of the above described deforming of plastic pips 60 to hold the scale in position, protuberances (not shown) may be formed integrally with housing half 14 in opposition to protuberances 16 in housing half 13, the opposed protuberances cooperating to engage opposite sides of the scale or chart 59 in a vise like grip when the screw is tightened in tapped aperture 19'. Thereafter the zero adjustment and the spring tension adjustment screws are manipulated to calibrate the device.

It can thus be seen that in view of the above described construction of the various components of the instant tester, and in view of the method in which it is assembled, the assembly can be effected by relatively untrained personnel having a minimum of instruction. Furthermore, since the accuracy of the scale is dependent on its inherent construction rather than on the skill with which the components are assembled, the tester will provide accurate readings notwithstanding that relatively untrained personnel can be utilized in its assembly.

While a preferred embodiment of the present invention is disclosed, it is to be understood that it is not limited thereto, but may be otherwise embodied within the scope of the following claims.

What is claimed is:

1. A portable wiper arm pressure tester comprising a housing having an upright body with a basal extension and forming therewith an L-shaped chamber opening upwardly from the extension, the upright body portion of the housing being formed to be grasped as a handle to facilitate the placement of the basal extension and its platform beneath the outer end of a wiper arm on a windshield, a platform having a stem portion depending through the chamber opening, a main lever having fulcrum support in opposed wall bearings within the extension, means providing fulcrum support for the stem portion on the lever to guide the platform in its testing movement in the extension opening, pointer means journaled upon a transverse axis within the upright chamber portion in the handle, the free end of the main lever extending from the basal extension into the upright chamber portion at a point beneath the transverse axis, a flexible connecting member extending upwardly from the free end to the pointer means, said pointer means carrying an eccentric cam member of greater radial extent from the transverse axis than the flexible member to provide a relatively longer arm, and spring means connected to the cam member and acting therethrough to actuate the pointer means.

2. A portable pressure tester for a windshield wiper arm or the like comprising a housing fabricated from two generally similar halves, a fulcrum pin having its ends supported by each of said housing halves, a main lever having spaced-apart legs, corresponding portions of each of said legs being mounted on said fulcrum pin by means of a self-aligning fit, a platform supported by and between said legs, a second fulcrum pin coupled between said platform and corresponding portions on each of said legs by means of a self-aligning fit, and indicating means operatively coupled to said main lever, said indicating means including a pointer associated with a scale mounted in said housing half, knife edge means for supporting said pointer with the opposite ends of said knife edge supported in each half of said housing, guide means tying the platform to one housing half, said first fulcrum pin and said knife edge means each having one end supported in the other housing half, and means for securing the two housing halves together to operatively enclose the testing mechanism aforesaid whereby the placing of a load on said platform results in a deflection of said indicating means of an amount which proportional to the magnitude of said load.

3. A pressure tester for a windshield wiper arm or the like comprising a housing, a platform movably mounted in said housing, a stabilizing link for guiding said platform in a predetermined direction, a main lever mounted in said housing for movement about a fulcrum pin, a load bearing pin coupling said platform and said main lever for relative pivotal movement during link-guided motion of the platform, pointer means carried by a cam, said cam being mounted for pivotal movement about a fixed axis and eccentric thereto, flexible band means coupled at one end to the free end of said main lever, at its other end to spring means and intermediate its ends to said eccentric cam, said spring means acting in opposition to a load applied to said platform, whereby said main lever is operative to move the pointer through one leverage and said spring is operative to move the pointer through a different leverage.

References Cited in the file of this patent
UNITED STATES PATENTS

| | | |
|---|---|---|
| 378,382 | Turnbull | Feb. 21, 1888 |
| 659,292 | Culmer | Oct. 9, 1900 |
| 1,850,628 | Jaenichen | Mar. 22, 1932 |
| 2,683,985 | Smulski | July 20, 1954 |

FOREIGN PATENTS

| | | |
|---|---|---|
| 195,576 | Great Britain | Apr. 5, 1923 |